United States Patent
Kaminosono

(10) Patent No.: US 7,298,419 B2
(45) Date of Patent: Nov. 20, 2007

(54) TELEVISION RECEIVER EMBEDDED WITH VIDEO RECORDING APPARATUS

(75) Inventor: Takeshi Kaminosono, Osaka (JP)

(73) Assignee: Funai Electric Co., Ltd., Daito-shi (JP)

( * ) Notice: Subject to any disclaimer, the term of this patent is extended or adjusted under 35 U.S.C. 154(b) by 539 days.

(21) Appl. No.: 11/003,643

(22) Filed: Dec. 3, 2004

(65) Prior Publication Data

US 2005/0152664 A1     Jul. 14, 2005

(30) Foreign Application Priority Data

Dec. 3, 2003    (JP)   ............................. 2003-405236

(51) Int. Cl.
     *H04N 11/00*      (2006.01)
     *H04N 5/44*      (2006.01)

(52) U.S. Cl. ...................................... 348/552; 348/553

(58) Field of Classification Search ................ 348/552, 348/553, 725, 728; 386/1, 46, 124, 17, 19; 725/133, 141, 153; *H04N 7/00, 11/00, 5/44*
See application file for complete search history.

(56) References Cited

U.S. PATENT DOCUMENTS 7,212,253 B1 *    5/2007    de Groot et al. ............. 348/553

FOREIGN PATENT DOCUMENTS

JP      2003-69955      3/2003

* cited by examiner

*Primary Examiner*—Sherrie Hsia
(74) *Attorney, Agent, or Firm*—Osha Liang LLP

(57) ABSTRACT

When the power is switched on, a CPU 41 sets up a video signal selector 47 to select a composite signal a output by an amplifier/detector 46. Meanwhile, a CPU 21 sets up a second video converter 31 to encode and to output, as a Y/C signal f, a digital broadcast video signal received across a signal path 33, and also transmits an initialization end notification to the CPU 41. Upon receiving this notification, the CPU 41 sets up the video signal selector 47 to select the Y/C signal f output by the second video converter 31.

3 Claims, 4 Drawing Sheets

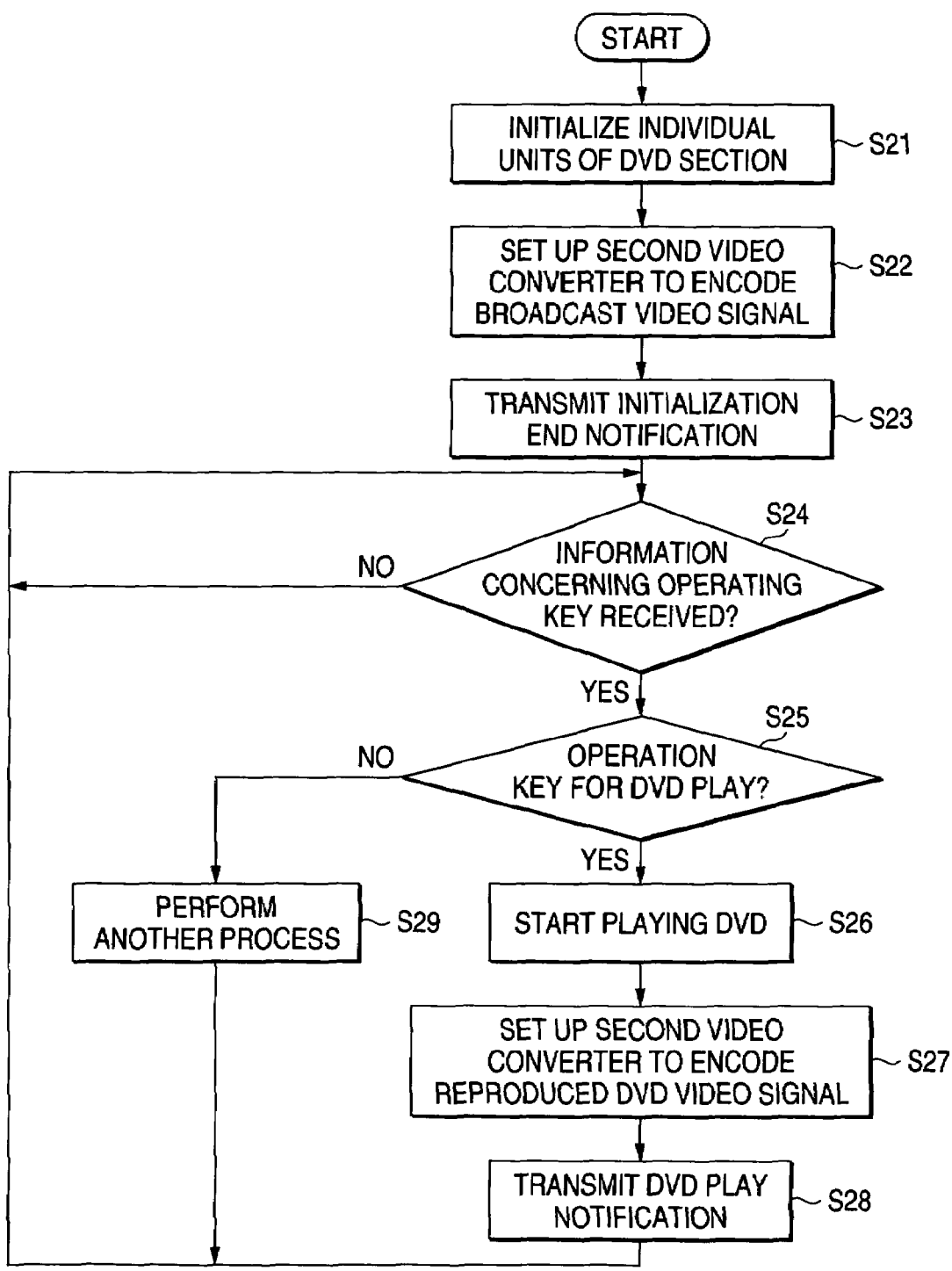

TELEVISION RECEIVER EMBEDDED WITH VIDEO RECORDING APPARATUS

BACKGROUND OF THE INVENTION

1. Field of the Invention

The present invention relates to a video display on a television receiver embedded with a video recording apparatus and a television receiver embedded with a video recording apparatus that have been powered on.

2. Description of the Related Art

Conventionally, when a television receiver embedded with a video recording apparatus is powered on, initialization of the video recording apparatus (DVD recording apparatus) is performed, so that images from a DVD can be reproduced and displayed immediately when a key on a remote controller is manipulated. During the initialization process, the following example procedures are performed. The optical pickup of the DVD recording apparatus is moved to a reference position, and data consisting, for example, of about several hundreds of K bytes are stored, unchanged or processed, by a microcomputer functioning as a controller, in another memory and in the internal register of an integrated circuit for the recording and reproduction of data. Therefore, about five seconds are required to complete the initialization process. When a DVD has already been loaded into the DVD recording apparatus when it is powered on, the DVD is played, and the data required for the display of a menu are stored in a memory, so that immediately after the menu key of a remote controller is manipulated, a title menu stored in the DVD can be displayed on the television receiver. Thus, the time required to complete the initialization process is even further extended. During the initialization process, a predetermined opening screen is displayed on the television receiver.

Disclosed in JP-A-2003-069955 is a technique whereby the picture of a preferred portion reproduced from a DVD is stored in a memory in advance, so that instead of an ordinary opening screen, this picture is employed as a preferred opening screen for a viewer.

SUMMARY OF THE INVENTION

However, for a conventional television receiver that incorporates a DVD recording apparatus, since the opening screen is displayed during a period extending from the time the power is switched on until the initialization process has been completed, a viewer can not immediately watch a program that is being broadcast. The technique disclosed in JP-A-2003-069955 does not resolve this problem.

To resolve this shortcoming, it is one of objects of the present invention to provide a television receiver embedded with a video recording apparatus and a television receiver embedded with a video recording apparatus that permit a viewer to watch a broadcast program immediately after the power is switched on.

According to a first aspect of the invention, there is provided a television receiver embedded with a video recording apparatus including: a broadcast receiver that performs channel-tuning for a broadcast signal and outputs a composite signal; a first video converter that converts the composite signal into a Y/C signal, and then converts the Y/C signal into a digital signal; a recording/reproducing unit that records the digital signals onto a DVD, and for reproducing data from the DVD; a second video converter that converts the reproduced data into a Y/C signal; a signal selector for selecting one of the composite signal or the Y/C signal; a video display unit that displays the signal selected by the signal selector; a signal path along which the digital signal obtained by the first video converter is to be transmitted to the second video converter; a first controller that controls the broadcast receiver and the signal selector; and a second controller that controls the recording/reproducing unit, the first video converter and the second video converter, wherein the first controller, after being powered on, controls the signal selector to select the composite signal, and, upon receiving an initialization end notification from the second controller, controls the signal selector to select the Y/C signal, and wherein the second controller, after being powered on, initializes the recording/reproducing unit, the first video converter and the second video converter, and then, following the completion of the initialization process, controls the second video converter to convert and then to output, as a Y/C signal, a signal received along the signal path, and sends the initialization end notice to the first controller and during the reproduction of data stored on the DVD, controls the second video converter to convert and then to output, as a Y/C signal, the reproduced data.

According to a second aspect of the invention, there is provided a television receiver embedded with a video recording apparatus including: a broadcast receiver that performs channel-tuning for a broadcast signal and outputs a composite signal; a first video converter that converts the composite signal into a Y/C signal and then converts the Y/C signal into a digital signal; a recording/reproducing unit that records the digital signal onto a recording medium and reproduces data recorded on the recording medium; a second video converter that converts the data reproduced by the recording/reproducing unit into the Y/C signal; a signal selector for selecting one of the composite signal and the Y/C signal; a video display unit that displays the signal selected by the signal selector; and a controller that, after being powered on, initializes the recording/reproducing unit, the first video converter and the second video converter, and controls the signal selector to select the composite signal.

BRIEF DESCRIPTION OF THE DRAWINGS

The above objects and advantages of the present invention will become more apparent by describing preferred exemplary embodiments thereof in detail with reference to the accompanying drawings, wherein:

FIG. 3 is a flowchart showing the operation of a DVD section; and

DETAILED DESCRIPTION OF THE PREFERRED EMBODIMENTS

Referring now to the accompanying drawings, a description will be given in detail of preferred embodiments of the invention.

Figure 1:
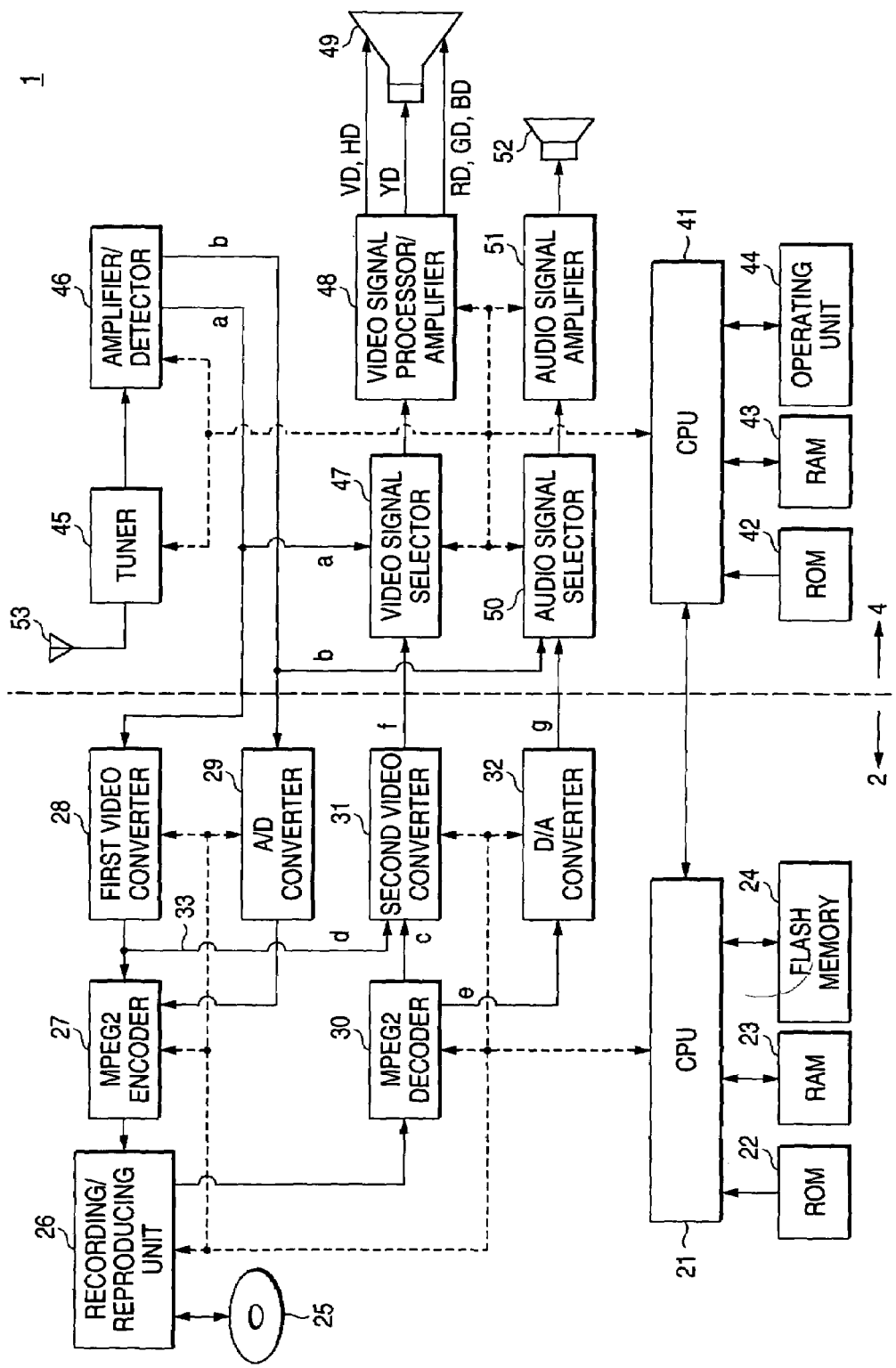
FIG. 1 is a block diagram showing a television receiver embedded with a video recording apparatus according to the present invention.

FIG. 1 is a block diagram, showing a television receiver 1 that includes a DVD recording/reproducing section 2 (hereinafter referred to as a DVD section 2) as a DVD recording apparatus and a television receiver section 4 (hereinafter referred to as a television section 4). To the left, along the vertical broken center line in FIG. 1, is the DVD section 2, while to the right is the television section 4. In FIG. 1, broken lines terminating in arrow heads indicate the transmission of control signals.

A broadcast signal received at an antenna 53 is tuned in by a tuner 45, and the resultant broadcast signal is transmitted to an amplifier/detector 46. The amplifier/detector 46 amplifies the broadcast signal, and detects a video signal and an audio signal. A composite signal a, which is the detected video signal, is transmitted to a first video converter 28 and a video signal selector 47, and a detected audio signal b is transmitted to an A/D converter 29 and an audio signal selector 50. The composite signal a is separated into one Y signal and two C signals by a Y/C separation circuit included in the video converter 28, i.e., is converted into a Y/C signal, and the Y/C signal is thereafter converted into a digital signal. The detected audio signal b is converted into a digital signal by the A/D converter 29, and the digital video signal and the digital audio signal are encoded by an MPEG2 encoder 27.

The thus encoded video signal and audio signal are recorded, by a Recording/reproducing unit 26, on a writable DVD 25, such as a DVD-R or DVD-RW. The Recording/reproducing unit 26 includes: an optical pickup, for writing data to the DVD 25 or for reading data from the DVD 25; a modulation circuit, for modulating the encoded video signal and the encoded audio signal to obtain write signals for the DVD 25; a demodulation circuit, for demodulating a signal read from the DVD 25; a tray, which is inserted or discharged with the DVD 25 mounted; and a rotation mechanism, for rotating the DVD 25. The data stored on the DVD 25 and reproduced by the Recording/reproducing unit 26 are decoded by an MPEG2 decoder 30.

A decoded video signal c (a reproduced video signal obtained from the DVD 25) is transmitted to a second video converter 31, and a digital broadcast video signal d, obtained by the first video converter 28, is also transmitted to the second video converter 31 along a signal path 33. In accordance with a signal received from a CPU 21 of the DVD section 2, which will be described later, the second video converter 31 encodes either the video signal c reproduced from the DVD 25 or the digital broadcast video signal d obtained by the first video converter 28, and outputs the encoded signal as a Y/C signal f to a video signal selector 47. A decoded video signal e is converted into an analog signal by a D/A converter 32, and the analog signal is transmitted to an audio signal selector 50. The Y/C signal f is composed of one Y signal and two C signals; however, the Y/C signal is shown as a single line in FIG. 1. The Recording/reproducing unit 26, the MPEG2 encoder 27 and the MPEG2 decoder 30 correspond to the recording/reproduction section for the present invention.

The CPU 21, a ROM 22, a RAM 23 and a flash memory 24 are provided for the DVD section 2. The CPU 21 executes a program stored in the ROM 22, and controls the operations of the individual units (e.g., the Recording/reproducing unit 26) of the DVD section 2. The RAM 23 is used as a memory area for various control data and a work area for the CPU 21. The setup data for the Recording/reproducing unit 26, the MPEG2 encoder 27, the MPEG2 decoder 30, the second video converter 31 and the first video converter 28 are stored in the flash memory 24, and when power is switched on, the CPU 21 reads these setup data to setup the individual units. Thereafter, in accordance with this setup, the units perform desired operations.

A CPU 41, a ROM 42, a RAM 43 and an operating unit 44 are provided for the television section 4. The CPU 41 executes a program stored in the ROM 42, and controls the operations of the individual units (e.g., the tuner 45) of the television section 4. The RAM 43 is used as a memory area for various control data and as a work area for the CPU 41. The operating unit 44 is, for example, a remote controller (not shown) having multiple operating keys. The remote controller has a power switch, a key (e.g., a play key) for operating the DVD section 2, and another key (e.g., a channel selection key) for operating the television section 4. When one of these operating keys is depressed, the CPU 41 performs a corresponding process. Further, when the operating key for the DVD section 2 is depressed, the CPU 41 transmits information for the operating key to the CPU 31 of the DVD section 2.

The audio signal selector 50 receives the broadcast audio signal b and a reproduced audio signal g obtained from the DVD 25, and outputs either one of these audio signals in accordance with a signal received from the CPU 41. The audio signal output by the audio signal selector 50 is amplified by an audio signal amplifier 51, and the resultant signal is output through loudspeakers 52.

The video signal selector 47 receives the composite signal a and the Y/C signal f, and outputs either one of these signals in accordance with a signal received from the CPU 41. The video signal output by the video signal selector 47 is processed and amplified by a video signal processor/amplifier 48, and the resultant signal is displayed on a CRT 49, a video display unit. It should be noted that the audio signal selector 50 and the video signal selector 47 are constituted by analog switches, for example.

The video signal processor/amplifier 48 is operated as follows. First, the operation performed upon receiving the composite signal a will be explained. A luminance signal is extracted by removing a signal having a frequency band near 3.58 MHz from the composite signal a. The luminance signal is amplified, and the resultant signal is output as a luminance drive signal YD. Further, a vertical sync signal and a horizontal sync signal are extracted from the composite signal a, and based on these two sync signals, a vertical scan signal and a horizontal scan signal are generated. Then, the two scan signals are amplified, and the resultant signals are output as a vertical scan drive signal VD and a horizontal scan drive signal HD. Furthermore, by using a band-pass filter having a center frequency of 3.58 MHz, a color signal is extracted from the composite signal a and demodulated. Then, using a matrix circuit, R, G and B signals are obtained and are amplified, and the obtained signals are output as R, G and B drive signals RD, GD and BD.

The operation of the video signal processor/amplifier 48 upon the reception of the Y/C signal f will now be described. First, a Y signal is amplified and the obtained signal is output as a luminance drive signal YD, while a vertical sync signal and a horizontal sync signal included in the Y signal are employed to generate and output a vertical scan drive signal VD and a horizontal scan drive signal HD. Following this, based on the Y signal and two C signals, R, G and B signals are obtained by the matrix circuit and are amplified, and the resultant signals are output as R, G and B drive signals RD, GD and BD.

In either case, the CRT 49 is driven in accordance with the luminance drive signal YD, the vertical scan drive signal VD, the horizontal scan drive signal HD and the R, G and B drive signals RD, GD and BD, and pictures are displayed on the CRT 49.

Figure 2:
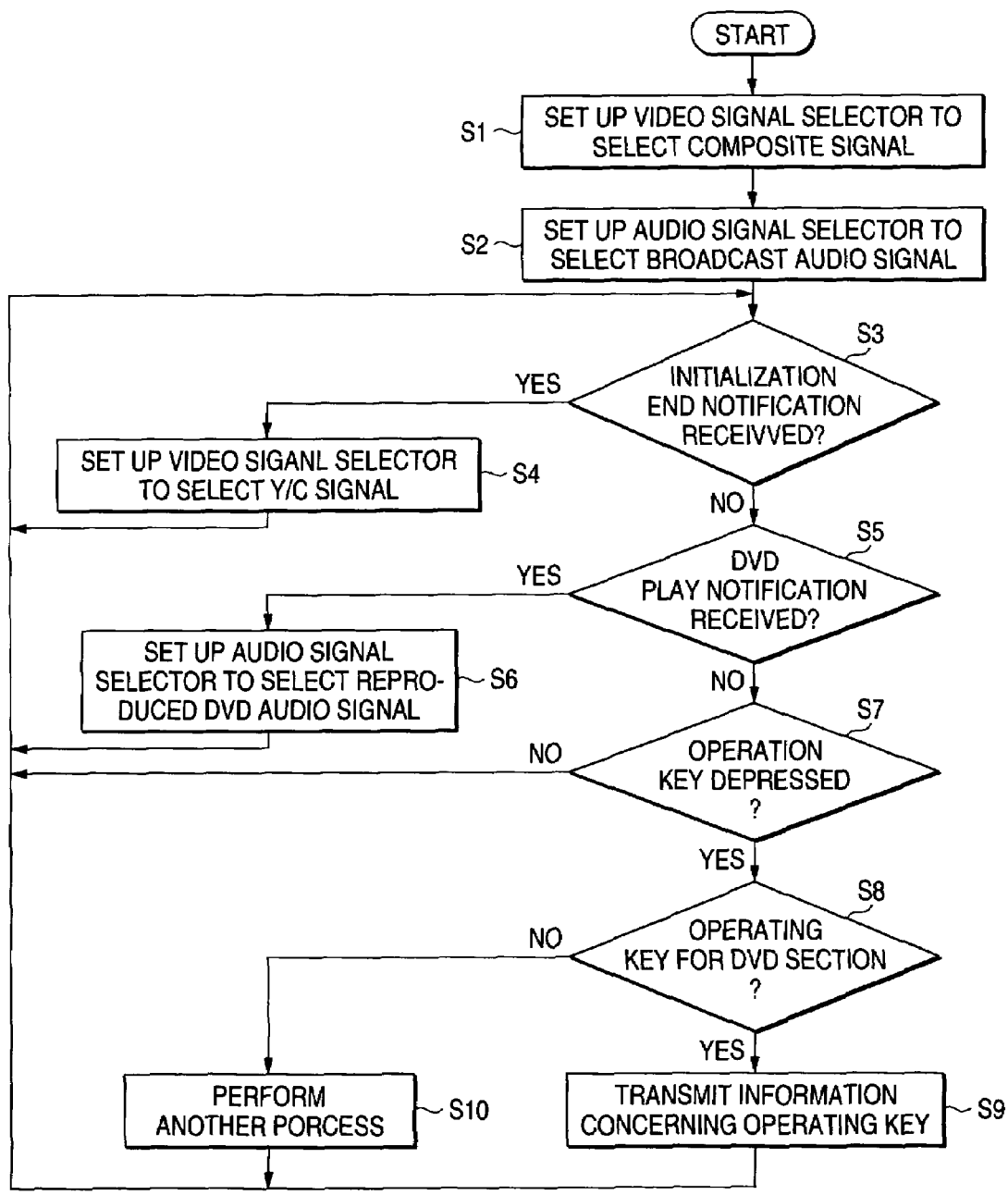
FIG. 2 is a flowchart showing the operation of a television section.

The operation of the television receiver 1 incorporating the DVD recording apparatus will now be described. FIG. 2 is a flowchart showing the operation of the television section 4, and FIG. 3 is a flowchart showing the operation of the DVD section 2. First, the operation of the television section 4 will be explained while referring to FIG. 2. When the television receiver 1 is powered on, CPU 41 of the television section 4 sets up the video signal selector 47 to select the composite signal a, which is a broadcast video signal (S1), and also sets up the audio signal selector 50 to select the broadcast audio signal b (S2). At this time, the tuner 45 selects a broadcast signal in accordance with the station number stored in the memory of the tuner 45.

Next, the CPU 41 determines whether an initialization end notification has been received from the CPU 21 of the DVD section 2 (S3). When the CPU 41 has received this notification, the CPU 41 sets up the video signal selector 47 to select the Y/C signal f (S4), and program control returns to S3. It should be noted that the television section 4 is controlled by a control flag (not shown), so that when the process at S3 is performed the next time, a decision of NO is obtained at S3. When the CPU 41 has not received the initialization end notification, the CPU 41 determines whether it has received a DVD play notification (S5). When the CPU 41 has received this notification, the CPU 41 sets up the audio signal selector 50 to select the reproduced audio signal g obtained from the DVD 25 (S6), and program control returns to S3. Since the DVD play notification is received after the initialization end notification, at this time the video signal selector 47 is already set to select the Y/C signal f. When the CPU 41 has not received the DVD play notification, the CPU 41 determines whether an operating key of the operating unit 44 has been depressed (S7).

When no operating key has been depressed, program control returns to S3. When one of the operating keys has been depressed, the CPU 41 determines whether the pertinent key is for the DVD section 2 (S8). When the operating key for the DVD section 2 has been depressed, the CPU 41 transmits information concerning the depressed operating key to the CPU 21 of the DVD section 2 (S9) and program control returns to S3. It should be noted, however, that when the CPU 41 has not yet received the initialization end notification, the CPU 41 does not transmit information for the operating key. And when the depressed operating key is not for the DVD section 2, the CPU 41 performs another process that is not directly related to the present invention (S10). For example, when an operating key for a volume increase/decrease has been depressed, the CPU 41 changes the amplification rate of the audio signal amplifier 51 to change the volume of the loudspeakers 52. When an operating key for channel selection has been depressed, the CPU 41 sets up station number information that it transmits to the tuner 45. And when an operating key for channel selection is depressed during the reproduction for the DVD 25, the CPU 41 sets up the audio signal selector 50 to select the audio signal b that is output by the amplifier/detector 46. Program control thereafter returns to S3.

The operation of the DVD section 2 will now be described while referring to FIG. 3. When powered on, the CPU 21 initializes the individual units (e.g., the Recording/reproducing unit 26) of the DVD section 2 (S21). During the initialization process, the CPU 21 reads data from the flash memory 24 and stores these data in the setup units, such as registers (not shown) for the Recording/reproducing unit 26, the MPEG2 encoder 27, the MPEG2 decoder 30, the second video converter 31 and the first video converter 28, and in the RAM 23, so that the DVD section 2 can perform desired operations. At this time, the CPU 21 processes, as needed, the data read from the flash memory 24 and stores the obtained data in the units described above. Then, the CPU 21 sets up the second video converter 31 to encode the broadcast video signal d (the signal output by the first video converter 28) (S22), and transmits an initialization end notification to the CPU 41 of the television section 4 (S23).

Sequentially, the CPU 21 determines whether information concerning the operating key has been received from the CPU 41 of the television section 4 (S24). When the CPU 21 has not received such information, the CPU 21 repeats the process at S24. When the CPU 21 has received the information for the operating key, the CPU 21 determines whether the operating key controls the playing of the DVD 25 (S25). When the operating key controls the playing of the DVD 25, the CPU 21 drives the rotation mechanism of the Recording/reproducing unit 26 to begin the reproduction of data on the DVD 25 (S26). Then, the CPU 21 sets up the second video converter 31 to encode the reproduced video signal c (the signal output by the MPEG2 decoder 30) obtained from the DVD 25 (S27), and transmits a DVD play notification to the CPU 41 of the television section 4 (S28). Program control thereafter returns to S24. When the CPU 21 determines at S25 that the operating key does not control the playing of the DVD 25, the CPU 21 performs another process that is not directly related to the present invention (S29). For example, when a record key is depressed, the CPU 21 records, on the DVD 25, a program broadcast across the channel tuned to by the tuner 45. Program control thereafter returns to S24.

To conclude this explanation, during a period in which the television receiver 1 incorporating the DVD recording apparatus is powered on and the individual units of the DVD section 2 are initialized, broadcast pictures are displayed on the CRT 49 in accordance with the composite signals a, so that a broadcast program can be viewed without waiting for the completion of the initialization. Furthermore, when the initialization process is terminated, broadcast pictures are displayed on the CRT 49 in accordance with the Y/C signals f output by the second video converter 31, so that broadcast pictures can be viewed that are clearer than those provided by the composite signals a. During the reproduction performed for the DVD 25, reproduced data are encoded by the second video converter 31 to obtain Y/C signals f, and based on the Y/C signals f, pictures for the reproduced data obtained from the DVD 25 are displayed on the CRT 49.

In this embodiment, the second video converter 31 encodes either a digital broadcast video signal d or a reproduced video signal c from the DVD 25 to obtain a Y/C signal, and the video signal selector 47 selects either the composite signal a or the Y/C signal f. However, the arrangement shown in FIG. 4A or 4B may be employed instead.

Figure 4A:
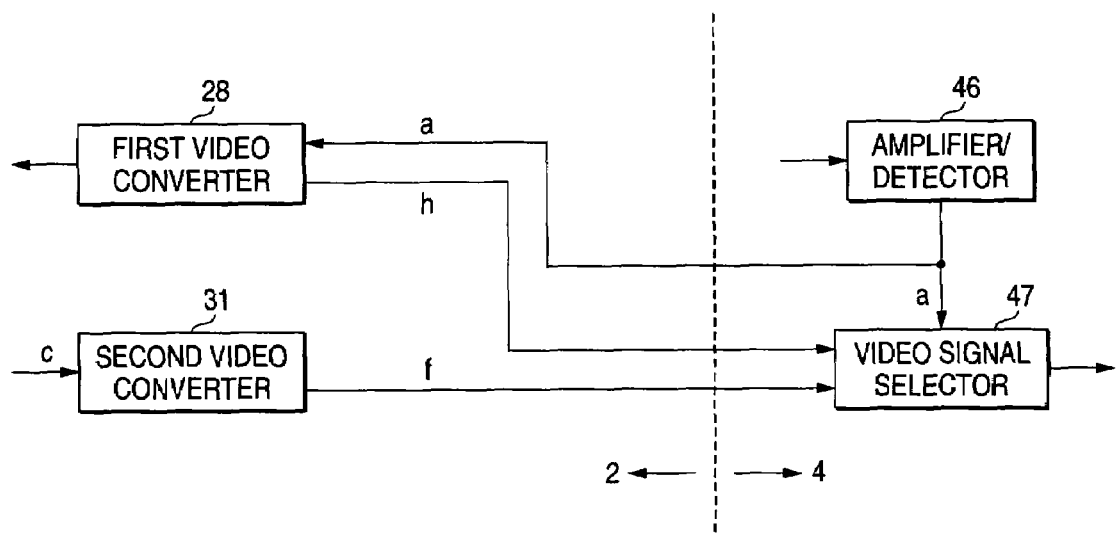
FIGS. 4A and 4B are diagrams showing other examples for a video signal selector.
Figure 4B:
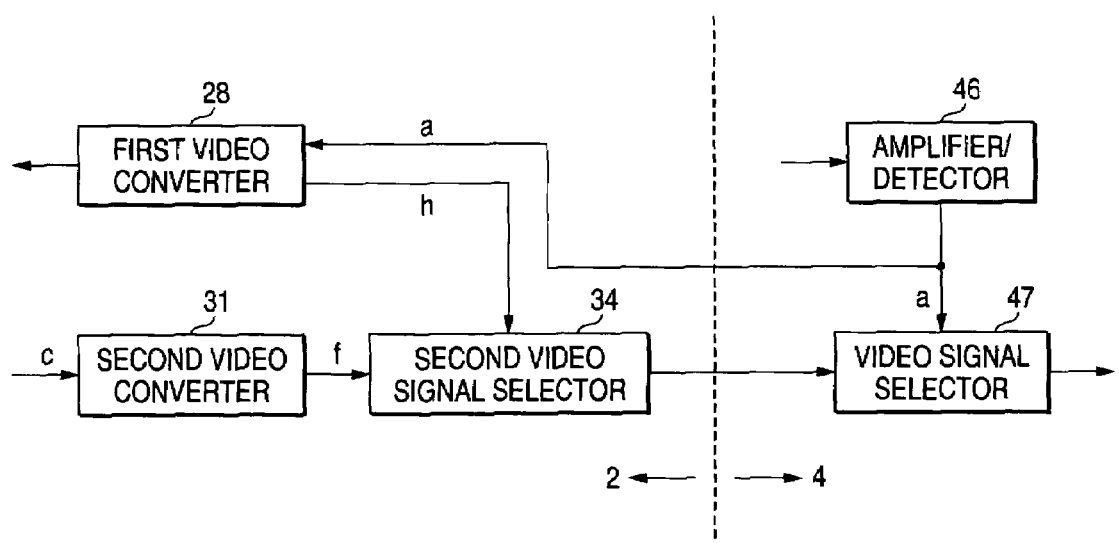

In FIG. 4A, the video signal selector 47 also receives the Y/C signal f that is generated by the video encoder 28, based on the composite signal a, and selects either the composite signal a, the Y/C signal f obtained by encoding the reproduced video signal obtained from the DVD 25, or a Y/C signal h generated based on the composite signal a. In FIG. 4B, an additional, second video signal selector 34 is provided that selects the Y/C signal f obtained by encoding the reproduced video signal obtained from the DVD 25 or the Y/C signal h generated based on the composite signal a. Then, the video signal selector 47 selects either the composite signal a or the Y/C signal f or h output by the second video signal selector 34. In this case, the video signal selector 47 and the second video signal selector 34 correspond to the video signal selector of the present invention.

Further, in this embodiment, a broadcast signal is recorded on the DVD 25. However, a recording medium other than the DVD 25 may be used, e.g., a hard disk. In addition, while in this embodiment only one tuner 45 is provided, the present invention can also be applied for a case wherein a tuner is also provided for the DVD section 2 to record a program in the same time slot on a different channel. Furthermore, in this embodiment, the CPU 41 (first controller) controls the television section 4, and the CPU 21 (second controller) controls the DVD section 2. However, only one controller may be employed to control the television section 4 and the DVD section 2.

As described above, according to the embodiment, when the Recording/reproducing unit is powered on and initialized, processing by the video decoder and the video encoder is performed, the signal selector selects a composite signal, and in accordance with the composite signal, a broadcast picture is displayed on the video display unit. Thus, immediately after the power is switched on, a broadcast program can be viewed without waiting for the initialization of the Recording/reproducing unit, the video decoder and the video encoder to be completed. Furthermore, following the completion of the initialization process, a broadcast picture is displayed on the video display unit in accordance with a Y/C signal, so that a problem that occurs when a broadcast picture is displayed in accordance with a composite signal, e.g., the dot jamming that occurs because a small color signal residual is retained in a luminance signal or the cross-color effect that occurs when a color signal is mixed in with a luminance signal, can be prevented, and clear broadcast pictures can be viewed. Further, since an expensive Y/C separation circuit, used for the generation of a Y/C signal is employed, in both cases, for the recording of a broadcast signal and for the viewing of a picture provided by a broadcast signal, the cost of a television receiver embedded with a video recording apparatus is not increased, and in either case, clear broadcast pictures can be viewed.

According to the embodiment, after being powered on, a broadcast program can be immediately viewed without waiting until the initialization process for the Recording/reproducing unit and the other units is completed.

Although the present invention has been shown and described with reference to a specific preferred embodiment, various changes and modifications will be apparent to those skilled in the art from the teachings herein. Such changes and modifications as are obvious are deemed to come within the spirit, scope and contemplation of the invention as defined in the appended claims.

What is claimed is:

1. A television receiver embedded with a video recording apparatus comprising:
   a broadcast receiver that performs channel-tuning for a broadcast signal and outputs a composite signal;
   a first video converter that converts the composite signal into a Y/C signal, and then converts the Y/C signal into a digital signal;
   a recording/reproducing unit that records the digital signals onto a DVD, and for reproducing data from the DVD;
   a second video converter that converts the reproduced data into a Y/C signal;
   a signal selector for selecting one of the composite signal or the Y/C signal;
   a video display unit that displays the signal selected by the signal selector;
   a signal path along which the digital signal obtained by the first video converter is to be transmitted to the second video converter;
   a first controller that controls the broadcast receiver and the signal selector; and
   a second controller that controls the recording/reproducing unit, the first video converter and the second video converter,
   wherein the first controller, after being powered on, controls the signal selector to select the composite signal, and, upon receiving an initialization end notification from the second controller, controls the signal selector to select the Y/C signal, and
   wherein the second controller, after being powered on, initializes the recording/reproducing unit, the first video converter and the second video converter, and then, following the completion of the initialization process, controls the second video converter to convert and then to output, as a Y/C signal, a signal received along the signal path, and sends the initialization end notice to the first controller and during the reproduction of data stored on the DVD, controls the second video converter to convert and then to output, as a Y/C signal, the reproduced data.

2. A television receiver embedded with a video recording apparatus comprising:
   a broadcast receiver that performs channel-tuning for a broadcast signal and outputs a composite signal;
   a first video converter that converts the composite signal into a Y/C signal and then converts the Y/C signal into a digital signal;
   a recording/reproducing unit that records the digital signal onto a recording medium and reproduces data recorded on the recording medium;
   a second video converter that converts the data reproduced by the recording/reproducing unit into the Y/C signal;
   a signal selector for selecting one of the composite signal and the Y/C signal;
   a video display unit that displays the signal selected by the signal selector; and
   a controller that, after being powered on, initializes the recording/reproducing unit, the first video converter and the second video converter, and controls the signal selector to select the composite signal.

3. The television receiver according to claim 2, wherein the signal selector selects one of the composite signal, the Y/C signal obtained by converting the reproduced data, and the Y/C signal obtained by converting the composite signal, and
   wherein the controller, after the initialization has been completed, controls the signal selector to select the Y/C signal that is obtained by converting the composite signal, and during the reproduction of data stored on the recording medium, controls the signal selector to select the Y/C signal obtained by converting the reproduced data.

* * * * *